United States Patent Office 3,424,806
Patented Jan. 28, 1969

3,424,806
PROCESS FOR THE HYDROGENOLYSIS OF ALKYL-AROMATIC ALCOHOLS TO THE CORRESPONDING HYDROCARBONS
Richard L. Golden, Teaneck, and Ernest I. Korchak, Hackensack, N.J., assignors to Halcon International, Inc., a corporation of Delaware
No Drawing. Filed Jan. 27, 1965, Ser. No. 428,549
U.S. Cl. 260—669     5 Claims
Int. Cl. C07c 1/20, 15/00

ABSTRACT OF THE DISCLOSURE

The present invention relates to the hydrogenolysis of an alpha alkyl aromatic alcohol in the liquid phase using a platinum group catalyst, and to the regeneration of catalysts which have become deactivated, through the above hydrogenolysis.

---

This invention relates to a process for the preparation of alkylaromatic compounds by the reduction of the corresponding alkylaromatic alcohols. More specifically, it relates to a liquid phase hydrogenolysis process whereby an alpha-alkylarmatic alcohol, produced as a reduction product of an alpha-alkylaromatic hydroperoxide when said alpha-alkylaromatic hydroperoxide is used to epoxidize an olefin, is reduced to a corresponding alkylaromatic compound.

The use of alpha-alkylaromatic hydroperoxides in the epoxidation of olefins has distinct advantages over other epoxidation methods suggested by the prior art such as oxidation with a peracid or with an oxygen-bearing gas. High yields, fast reaction rates, low cost and safe operating procedues are important features of this method of epoxidation.

A by-product of the epoxidation reaction is the alpha-alkylaromatic alcohol which may have no substantial commercial use and which if unreclaimed represents a major economic burden to the process.

One method of reclaiming the alcohol is dehydrating it to the corresponding olefinic compound. For instance, alphaphenylethanol can be dehydrated to styrene and dimethylphenylcarbinol can be dehydrated to alphamethylstyrene.

Another method of reclaiming the alcohol is to subject it to hydrogenolysis in the vapor phase in the presence of a catalyst to form the alkylaromatic compound. This process requires a reaction at elevated temperatures and equipment to carry out the reaction in the gas phase.

It is an object of this invention to provide a process for the liquid phase hydrogenolysis of alpha-alkylaromatic alcohols to the alkyl aromatic hydrocarbon.

It is a further object of this invention to provide a low temperature process for the hydrogenolysis of said alpha-alkylaromatic alcohols.

It is a still further object of this invention to provide a low temperature, liquid phase process for the hydrogenolysis of alpha-alkylaromatic alcohols formed as the reduction products of alpha-alkylaromatic hydroperoxides when the latter are used to epoxidize an olefin.

Other objects will be apparent from the following description of the invention.

In accordance with the present invention it has been discovered that alpha-alkylaromatic alcohols can be subjected to catalytic hydrogenolysis in the liquid phase under comparatively mild conditions and that high yields to alkylaromatic compounds can be obtained.

It has been discovered that the conversion of alpha-alkylaromatic alcohols will take place above 24° C. but that it is important to maintain the reaction temperature above 50° C. and preferably above 80° C.

A totally unexpected catalytic phenomenon has been discovered. It is common in the art that catalysts tend to deactive more rapidly at higher temperatures and tend to retain their activity longer at lower temperatures. In this system the inverse is true. When operating at temperatures below 80° C., catalyst activity decreases; after a period of hours, the rate of conversion of alcohol is much lower than at the start of operation. However, if the catalyst is regenerated by solvent washing it is possible to achieve high rates of conversion, although a catalyst deactivation again will occur and the rate of conversion will eventually reach the same level as before catalyst regeneration. At temperatures above 50° C. the deactivation phenomenon is less marked and at temperatures above 80° C. negligible deactivation occurs.

This deactivation phenomenon has been atrributed to an adsorption of some material formed as an intermediate in the reaction sequence, on the active catalyst sites. It is not thought to be due to an impurity in the feed alcohols since even the most highly purified alcohols exhibit the same effect. Almost any inert solvent either aqueous or non-aqueous can be used in the solvent-wash regeneration, but those most preferred are those indigenous to the system such as the pure alcohol or the pure alkylaromatic compound. The regeneration is carried out by thoroughly containing the catalyst with solvent for a period of from 5 minutes to 10 hours; usually one hour suffices for complete regeneration. The regeneration is carried out faster and more effectively if high volumes of solvent are used, if the catalyst is agitated in the solvent and if high solvent temperatures are employed. Suitable solvents are cyclic or acyclic hydrocarbons, oxygenated compounds such as water, ethers, alcohols, esters, acids and ketones, and numerous others. Specific examples of preferred solvents are cumene, ethylbenzene, alpha-phenylethanol, dimethylphenylcarbinol, benzene, and toluene.

Reaction temperature has an effect on the hydrogenolysis other than with respect to catalyst activity. In general, conversion of alcohol is increased with operation at higher temperatures, but at temperatures above 120° C. hydrogenation of the aromatic ring takes place with consequent loss in yield.

The metal catalyst which effects the conversion of alpha-alkylaromatic alcohols is chosen from among the platinum group metals. Suitable catalysts are the elementary form or compounds of platinum, iridium, osmium, palladium and rhodium. A specific and preferred metal for use as a catalyst in this invention is palladium.

The metal can also be in such combined form as oxide, halide, sulfide, sulfate and phosphate, or as a double salt. Specific examples of catalysts are palladium chloride, platinum chloride, palladium oxide, platinum oxide, palladium sulfate, palladium phosphate, palladium sulfide, and the corresponding compounds of the other platinum group metals.

The catalyst may be supported on a broad range of inert supports such as silica gel, magnesium carbonate, alumina, kieselguhr, carbon, barium sulfate, asbestos and the like. These supports may be in granular or pelleted form having a large surface to volume ratio. Carbon and aluminas have been found to be particularly satisfactory supports.

The percentage of the catalytic material on the support may be generally from 0.05 to 50% by weight of the support, but desirably is between 0.1% and 20%.

The liquid feed may be pumped through the catalyst bed or trickled through it or otherwise contacted with it to insure good liquid-catalyst interaction. The space velocity defined as volume of liquid feed per volume of catalyst and support may be in the range of 0.01 to 100 reciprocal hours. In general the conversion of alcohol is increased as the space velocity is decreased.

Unconverted alcohol is separated from the alkylaromatic compound by distillation; the alcohol is the bottoms product. Small amounts of phenol which may be present in the system and has acidic properties may tend to degrade the alcohol during distillation and cause a loss in yield. For this reason it is desirable that all the alcohol be converted during hydrogenolysis.

The liquid feed to the hydrogenolysis can be the effluent of an epoxidation reaction from which epoxides, unconverted olefins and light ends have been removed and which has been freed, usually by a simple flash technique, of heavy residues and catalyst from the epoxidation tep. It will contain traces of unconverted alpha-alkylaromatic hydroperoxide phenol, and by-product alkylaromatic ketone as well as the alpha-alkylaromatic alcohol. Additionally, alkylaromatic compound from which the hydroperoxide was formed and solvent used in the epoxidation reaction may be present. Typical feed mixtures will contain generally from 10 to 80% alcohol, 20 to 80% alkylaromatic, less than 1% ketone and less than 1% phenol. However, it is possible to operate outside these ranges as well.

In the preferred method of operation, the epoxidation effluent is stripped of unconverted olefin, epoxide and other light ends and then flashed at 130° C. and 100 mm. Hg; residue, epoxidation catalyst and some alcohol are removed as a bottoms product and recycled to the epoxidation step. The flashed vapor is condensed and subjected to hydrogenolysis.

Hydrogen, fed as pure gas or in conjunction with other inert gases, may be introduced to the catalyst-liquid system either co-currently or counter-currently. It may be provided in excess of the stoichiometric requirement or in quantities less than the stoichiometric requirement; however, since complete alcohol conversion is desirable it is preferably supplied in excess.

Hydrogen partial pressure has a marked effect on alcohol conversion. Conversion is increased as hydrogen partial pressure is increased. Desirably, the pressure should be 20 to 1000 p.s.i.g., and preferably 50 to 200 p.s.i.g.

The effluent from the hydrogenolysis is further processed by one of two schemes. The first scheme is comprised of an initial distillation to remove small amounts of light ends that have formed, followed by a distillation to remove phenol as a bottoms product. The alkylaromatic compound is then recycled to the peroxidation step.

The second scheme includes a water extraction of the hydrogenolysis effluent to remove phenol and a light-ends distillation to purify the alkylaromatic prior to recycle.

The organic hydroperoxides which may be employed in the epoxidation step are those having the formula ROOH where R is a substituted or unsubstituted alkyl, cycloalkyl or aralkyl radical preferably having about 3 to 20 carbon atoms. Those preferred are alpha-alkylaromatic hydroperoxides such as cumene hydroperoxide, ethylbenzene hydroperoxide, p-ethyl toluene hydroperoxide, and diisopropylbenzene hydroperoxide. Cumene hydroperoxide is an especially effective species.

The catalysts which are most effective in the epoxidation reaction include compounds of the following: Ti, V, Cr, Cb, Se, Zr, Nb, Mo, Te, Ta, W, Re, U. These may be characterized as forming peracids or as hydroxylation catalysts. By far, the preferred catalysts are compounds of V, Ta, Ti, Mo, W, Nb, Te, Re or Se. Mixtures may also be used.

These compounds may be employed in a form initially soluble in the reaction medium. While solubility will of course depend on the particular reaction medium, a suitably soluble substance would include hydrocarbon soluble organo-metallic compounds having a solubility in methanol at room temperature of at least 0.1 gram per liter. Illustrative soluble forms of the catalytic compounds are the naphthenates, stearates, carbonates and the like. Various chelates, association compounds and enol salts, such as aceto-acetonates may also be used. The most preferred catalysts are compounds of vanadium and molybdenum such as naphthenates and carbonyls.

The amount of catalyst required in the epoxidation is at least 0.01 millimoles of metal per mole of peroxy compounds. Preferably from 0.02 to 40 millimoles, and desirably 0.1 to 4.0 should be used.

The olefinic materials which can be epoxidized include both substituted and unsubstituted olefinic and alicyclic olefins which may be hydrocarbons, esters, alcohols, ketones, ethers or the like having from about 2 to 20 carbon atoms, and preferably at least 3 carbon atoms. Illustrative olefins are ethylene, propylene, normal butylene, isobutylene, the pentenes, methyl pentenes, octenes, dodecenes, cyclohexenes, methyl cyclohexenes, and the like. Halogen, oxygen or sulphur substituted olefins can also be used. These are illustrated by allyl alcohol, allyl mercaptan, cyclohexanol, methylmethacrylate, methyl oleate, allyl chloride and the like.

Temperatures required for epoxidation are broadly in the range of about −20 to 200° C. and preferably, 60 to 120° C. Pressure conditions, illustratively atmospheric to 1000 p.s.i.g., must be sufficient to maintain the liquid phase.

The epoxidation reaction time may be from 1 minute to 10 hours depending upon the activity of the materials employed and the desired conversion. Normally, reaction times from about five minutes to 4 hours are employed.

The ratio of olefin to organic peroxy compounds is broadly in the range of 1:15 to 20:1 and preferably 2:1 to 5:1. The initial hydroperoxide concentration will normally be 1% or more although lesser concentrations are also effective.

It is generally desirable that the epoxidation reaction be carried out in the presence of a solvent. Suitable substances are olefinic, naphthenic, or aromatic hydrocarbons and their oxygenated derivatives. Alcohols, ketones, ethers and esters are particularly advantageous and the presence of alcoholic of ketonic substances has frequently been useful even when the major solvent is a hydrocarbon material. Preferred solvents are those which have the same carbon ring structure as the hydroperoxide being used. Solvent loss and separation problems are minimized in this fashion.

The following examples set forth preferred embodiments of the invention but are not to be construed as limiting its scope. Unless otherwise indicated all percentages and parts are on a weight basis.

Example I

A mixture consisting of 13.5 parts of cumene hydroperoxide, 23.0 parts of cumene, 35.0 parts of dimethylphenylcarbinol, 0.4 part of Mo naphthenate (containing 5% Mo), 0.1 part of Na naphthenate, and 28.0 parts of propylene was pumped through a reaction chamber held at a temperature of 110° C. and a pressure of 650 p.s.i.g. Residence time of the reaction mixture in the reactor was about 2 hours.

The reaction mixture was then distilled to remove unreacted propylene and propylene oxide product; the undistilled bottoms consisted of 23.0 parts of cumene, 47.1 parts of dimethylphenylcarbinol, 0.4 part of Mo naphthenate, and 0.1 part of Na naphthenate. This mixture was then flashed at 130° C. and 100 mm. Hg. The liquid phase containing essentially all of the Mo naphthenate and Na naphthenate catalyst and a small amount of dimethylphenylcarbinol was recycled to the epoxidation step. The vapor phase was condensed and further treated as set forth below.

A hydrogenolysis reactor consisting of a ½″ diameter steel tube was loaded with 16 grams of catalyst prepared as follows:

95 grams of 12/40 mesh activated granular carbon was added to a $PdCl_2$ solution prepared by dissolving 8.4 grams $PdCl_2$ in 160 cc. of 6 N HCl. The mixture was boiled gently for 1 hour and then allowed to stand overnight. The mixture was then placed in a rotary catalyst dryer and heated to evaporate the water. The dry catalyst particles were then transferred to a glass tube contained in a furnace. The tube was flushed with nitrogen, the temperature raised to 90° C., and hydrogen flow introduced. The temperature was raised slowly to 100° C. and was then maintained at 110° C. for 1 hour. The temperature was then raised to 200° C. at the rate of 25° C./hr. and held at 200° C. overnight with the flow continuing. When the effluent hydrogen showed no further traces of chloride, the catalyst was flushed with nitrogen and cooled.

The alcohol-cumene mixture was fed to the hydrogenolysis reactor at a space velocity of 0.5 hr.–1, a pressure of 200 p.s.i.g., and a temperature of 80° C.

After 4 hours of operation, the conversion of alcohol to cumene was 99%, and after 24 hours of operation, the conversion was 99%.

Example II

The experiment of Example I was repeated with the exception that the hydrogenolysis reactor was operated at 65° C. After 4 hours of operation, the alcohol conversion was 99%; and after 24 hours of operation, the conversion was 97%.

Example III

The experiment of Example I was repeated with the exception that the hydrogenolysis reactor was operated at 45° C. After 4 hours of operation the alcohol conversion was 82%; and after 24 hours of operation, the conversion was 55.5%.

Example IV

The spent catalyst from Example III was regenerated by passing cumene over the catalyst at the rate of 3 liters/hour for 30 minutes, at 150° C. The reactor was then operated as in Examples I, II, and III and the initial conversions were again 99%.

Example V

The epoxidation procedure carried out in Example I is carried out using ethylbenzene hydroperoxide instead of cumene hydroperoxide. The resultant alphaphenylethanol is subjected to hydrogenolysis at temperatures of 80° C., 65° C. and 45° C. as described in Examples I, II and III. The results obtained are similar to those obtained with the dimethylphenylcarbinol. The deactivated catalyst from the 45° C. run is regenerated as in Example IV uisng ethylbenzene as the solvent.

Example VI

The epoxidation procedure of Example I is carried out using p-ethyltoluene alphahydroperoxide instead of cumene hydroperoxide. The resultant alcohol is subjected to hydrogenolysis at temperatures of 80° C. 65° C. and 45° C. as described in Examples I, II and III. The results are similar to those obtained with the dimethylphenylcarbinol. The deactivated catalyst from the 45° C. run is regenerated as in Example IV using p-ethyltoluene as the solvent.

Example VII

The epoxidation procedure of Example I is carried out using alphaphenyl betamethyl-propyl hydroperoxide instead of cumene hydroperoxide. The resultant alphaphenyl-beta methyl-propanol is subjected to hydrogenolysis at temperatures of 80° C., 65° C., and 45° C. as described in Examples I, II and III. The results are similar to those obtained with the dimethylphenylcarbinol. The deactivated catalyst from the 45° C. run is regenerated as in Example IV using the corresponding hydrocarbon with the same skeletal structure as solvent.

Example VIII

The epoxidation procedure of Example I is carried out using alpha-tetrahydronaphthalene hydroperoxide instead of cumene hydroperoxide. The resultant alpha-tetrahydronaphthalene alcohol is subjected to hydrogenolysis at temperatures of 80° C., 65° C., and 45° C. as described in Examples I, II and III. The results are similar to those obtained with the dimethylphenylcarbinol. The deactivated catalyst from the 45° C. run is regenerated as in Example IV using tetrahydronaphthalene as the solvent.

Example IX

The epoxidation procedure of Example I is carried out using alpha-alphadimethyl-paraisopropylphenyl hydroperoxide instead of cumene hydroperoxide. The resultant alpha-alphadimethyl-paraisopropylphenylcarbinol is subjected to hydrogenolysis at temperatures of 80° C., 65° C., and 45° C., as described in Examples I, II and III. The results are similar to those obtained with the dimethylphenylcarbinol. The deactivated catalyst from the 45° C. run is regenerated as in Example IV using p-diisopropylbenzene as the solvent.

In view of the foregoing disclosures, variations and modifications thereof will be apparent to one skilled in the art, and it is intended to include within the invention all such variations and modifications except as do not come within the scope of the appended claims.

What is claimed is:

1. A process for the catalytic hydrogenolysis of an alpha alkyl aromatic alcohol to form the correponsonding alkyl aromatic hydrocarbon comprising contacting said alcohol in the liquid phase with a supported platinum group metal catalyst at a temperature maintained above 50° C. and not greater than 120° C. and separating product alkyl aromatic hydrocarbon from the reaction mixture.

2. A process of claim 1 wherein the catalyst is palladium.

3. A process of claim 1 wherein the alpha-alkylaromatic alcohol is alpha-phenylethanol and the product is ethylbenzene.

4. A process of claim 1 wherein the alpha-alkylaromatic alcohol is dimethylphenylcarbinol, and the product is cumene.

5. A process of claim 1 wherein the alpha alkyl aromatic alcohol is alpha-tetrahydronaphthalene alcohol and the product is tetrahydronaphthalene.

References Cited

UNITED STATES PATENTS 2,863,929  12/1958  Lowell _____ 260—683.9 XR
2,929,855  3/1960   O'Connor et al. _____ 260—669
3,110,747  11/1963  Mullineaux _____ 260—683.9

DELBERT E. GANTZ, *Primary Examiner.*

C. R. DAVIS, *Assistant Examiner.*

U.S. Cl. X.R.

260—668